US012323753B2

(12) United States Patent
Chen et al.

(10) Patent No.: US 12,323,753 B2
(45) Date of Patent: Jun. 3, 2025

(54) MICRO-ELECTRO-MECHANICAL SYSTEM STRUCTURE

(71) Applicant: Fortemedia, Inc., Santa Clara, CA (US)

(72) Inventors: Chih-Yuan Chen, Tainan (TW); Feng-Chia Hsu, Tainan (TW); Chun-Kai Mao, Tainan (TW); Jien-Ming Chen, Tainan (TW); Wen-Shan Lin, Tainan (TW); Nai-Hao Kuo, Tainan (TW)

(73) Assignee: FORTEMEDIA, INC., Alviso, CA (US)

( * ) Notice: Subject to any disclaimer, the term of this patent is extended or adjusted under 35 U.S.C. 154(b) by 314 days.

(21) Appl. No.: 17/933,208

(22) Filed: Sep. 19, 2022

(65) Prior Publication Data

US 2023/0319450 A1 Oct. 5, 2023

Related U.S. Application Data

(60) Provisional application No. 63/325,745, filed on Mar. 31, 2022.

(51) Int. Cl.

| | |
|---|---|
| ***H04R 19/04*** | (2006.01) |
| ***H04R 1/08*** | (2006.01) |
| ***H04R 7/04*** | (2006.01) |
| ***H04R 19/00*** | (2006.01) |
| ***H04R 19/01*** | (2006.01) |

(52) U.S. Cl.

CPC ................. *H04R 1/08* (2013.01); *H04R 7/04* (2013.01); *H04R 2201/003* (2013.01)

(58) Field of Classification Search

CPC ... H04R 1/08; H04R 7/04; H04R 9/08; H04R 17/02; H04R 19/016; H04R 19/00; H04R 19/04; H04R 19/005; H04R 19/01; H04R 2201/003; H04R 2201/00; B81B 3/0027; B81B 2201/0257; B81B 2203/0127

See application file for complete search history.

(56) References Cited

U.S. PATENT DOCUMENTS

| | | | | |
|---|---|---|---|---|
| 8,363,860 | B2 * | 1/2013 | Zhang | H04R 19/005 381/175 |
| 8,541,852 | B2 * | 9/2013 | Kasai | G01H 11/06 257/416 |
| 9,400,224 | B2 * | 7/2016 | Chen | G01L 9/0073 |
| 9,712,924 | B2 * | 7/2017 | Yoo | H04R 19/005 |
| 9,866,970 | B2 * | 1/2018 | Yoo | B81C 1/00182 |

(Continued)

FOREIGN PATENT DOCUMENTS

| | | | | |
|---|---|---|---|---|
| CN | 106412782 A | * | 2/2017 | H04R 19/016 |
| CN | 113691916 A | * | 11/2021 | |

*Primary Examiner* — Edgardo San Martin
(74) *Attorney, Agent, or Firm* — McClure, Qualey & Rodack, LLP

(57) ABSTRACT

A MEMS structure is provided. The MEMS structure includes a substrate having an opening portion and a backplate disposed on one side of the substrate and having acoustic holes. The MEMS structure also includes a diaphragm disposed between the substrate and the backplate and extending across the opening portion of the substrate. The diaphragm includes a ventilation hole, and an air gap is formed between the diaphragm and the backplate. The MEMS structure further includes a protrusion extending into the air gap.

15 Claims, 15 Drawing Sheets

M

(56) References Cited

U.S. PATENT DOCUMENTS

| | | | | |
|---|---|---|---|---|
| 9,950,920 | B2 * | 4/2018 | Lin | B81C 1/00158 |
| 10,158,952 | B2 * | 12/2018 | Sun | H04R 31/003 |
| 10,250,998 | B2 * | 4/2019 | Hsieh | B81B 3/007 |
| 10,327,077 | B2 * | 6/2019 | Yoo | H04R 19/005 |
| 10,343,898 | B1 * | 7/2019 | Chen | H04R 7/08 |
| 11,172,287 | B2 * | 11/2021 | Hsieh | B81B 3/0064 |
| 11,202,153 | B2 * | 12/2021 | Chen | H04R 7/16 |
| 11,208,320 | B2 * | 12/2021 | Kim | H04R 7/04 |
| 11,223,908 | B1 * | 1/2022 | Jiang | H04R 19/005 |
| 11,259,106 | B1 * | 2/2022 | Chen | H04R 7/06 |
| 11,259,125 | B2 * | 2/2022 | Lee | H04R 19/04 |
| 11,459,230 | B2 * | 10/2022 | Chen | H04R 19/04 |
| 11,943,584 | B2 * | 3/2024 | Chen | B81B 3/001 |
| 2008/0232615 | A1 * | 9/2008 | Song | H04R 19/005 381/174 |
| 2019/0394573 | A1 * | 12/2019 | Cheng | H04R 19/04 |
| 2022/0396469 | A1 * | 12/2022 | Chen | H04R 7/06 |
| 2023/0319486 | A1 * | 10/2023 | Mao | B81B 3/0072 381/174 |

* cited by examiner

MICRO-ELECTRO-MECHANICAL SYSTEM STRUCTURE

CROSS REFERENCE TO RELATED APPLICATIONS

This application claims the benefit of U.S. Provisional Application No. 63/325,745, filed on Mar. 31, 2022, the entirety of which is incorporated by reference herein.

BACKGROUND

Technical Field

Embodiments of the present disclosure relate in general to an acoustic transducer, and in particular they relate to a micro-electro-mechanical system (MEMS) structure that may be used in a micro-electro-mechanical system microphone.

Description of the Related Art

The current trend in personal electronics is toward fabricating slim, compact, lightweight and high-performance electronic devices, including microphones. A microphone is used to receive sound waves and convert acoustic signals into electrical signals. Microphones are widely used in daily life and are installed in such electronic products as telephones, mobiles phones, and recording pens. In a capacitive microphone, variations in acoustic pressure (i.e., local pressure deviation from the ambient atmospheric pressure caused by sound waves) force the diaphragm to deform correspondingly, and the deformation of the diaphragm induces a capacitance variation. The variation of acoustic pressure of the sound waves can thus be obtained by detecting the voltage difference caused by the capacitance variation.

This is distinct from conventional electret condenser microphones (ECM), in which mechanical and electronic elements of micro-electro-mechanical system (MEMS) microphones can be integrated on a semiconductor material using integrated circuit (IC) technology to fabricate a miniature microphone. MEMS microphones have such advantages as a compact size, being lightweight, and having low power consumption, and they have therefore entered the mainstream of miniaturized microphones.

Although existing MEMS microphones have generally been adequate for their intended purposes, they have not been entirely satisfactory in all respects. For example, the specifications of high-end microphones not only include signal-to-noise ratio (SNR) and acoustic overload point (AOP) performance requirements, but also the need to meet low-frequency roll off (LFRO) requirements. In addition, the phase mismatch between different MEMS microphones also needs to be minimized SUMMARY The micro-electro-mechanical system (MEMS) structure in the present disclosure may be used in a micro-electro-mechanical system microphone, which includes a protrusion disposed on the backplate or the diaphragm. In some embodiments, due to the protrusion, a short distance is formed between the protrusion and the diaphragm, which may increase the acoustic resistance, thereby enhancing the signal-to-noise ratio (SNR). It may also reduce the phase mismatch between MEMS microphones.

Some embodiments of the present disclosure include a MEMS structure. The MEMS structure includes a substrate having an opening portion and a backplate disposed on one side of the substrate and having acoustic holes. The MEMS structure also includes a diaphragm disposed between the substrate and the backplate and extending across the opening portion of the substrate. The diaphragm includes a ventilation hole, and an air gap is formed between the diaphragm and the backplate. The MEMS structure further includes a protrusion extending into the air gap.

In some embodiments, the protrusion extends from the backplate towards the diaphragm.

In some embodiments, the distance between the protrusion and the diaphragm is smaller than 0.5 μm.

In some embodiments, the protrusion extends from the diaphragm towards the backplate.

In some embodiments, from a top view of the micro-electro-mechanical system structure, the protrusion is formed as a closed pattern.

In some embodiments, from a top view of the micro-electro-mechanical system structure, the closed pattern surrounds at least a portion of the ventilation hole.

In some embodiments, the acoustic holes are disposed outside the closed pattern.

In some embodiments, the MEMS structure further includes a plurality of protrusions extending into the air gap.

In some embodiments, from a top view of the micro-electro-mechanical system structure, the protrusions form a plurality of closed patterns.

In some embodiments, the closed patterns are connected with each other.

In some embodiments, the closed patterns are separated from each other.

In some embodiments, at least two of the closed patterns have the same center.

In some embodiments, the ventilation hole is surrounded by two or more of the protrusions.

In some embodiments, from a top view of the micro-electro-mechanical system structure, the protrusions have different shapes.

In some embodiments, from a top view of the micro-electro-mechanical system structure, the protrusion is formed as a curve.

In some embodiments, from a top view of the micro-electro-mechanical system structure, at least one of the acoustic holes is disposed on a side of the protrusion far away from the center of the backplate.

In some embodiments, the MEMS structure further includes a dielectric layer disposed between the substrate and the diaphragm and between the diaphragm and the backplate. The dielectric layer has an inner edge, and the orthogonal projection of one acoustic hole on the diaphragm is between the orthogonal projection of the inner edge on the diaphragm and the orthogonal projection of the protrusion on the diaphragm.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
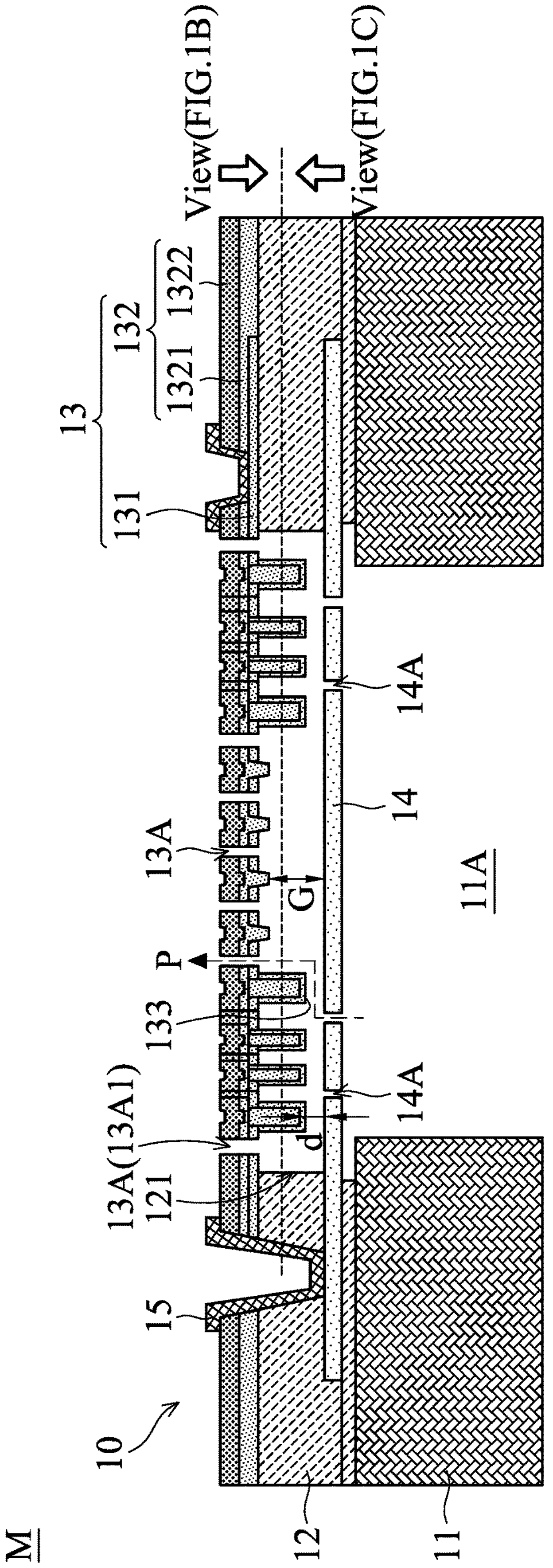
FIG. 1A is a partial cross-sectional view illustrating a micro-electro-mechanical system (MEMS) microphone according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It should be understood that additional steps may be implemented before, during, or after the illustrated methods, and some steps might be replaced or omitted in other embodiments of the illustrated methods.

Furthermore, spatially relative terms, such as "beneath." "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1A is a partial cross-sectional view illustrating a micro-electro-mechanical system (MEMS) microphone M according to some embodiments of the present disclosure. For example, the MEMS microphone M may be a capacitive microphone. As shown in FIG. 1A, the MEMS microphone M includes a MEMS structure 10. In some embodiments, the MEMS structure 10 includes a substrate 11, a dielectric layer 12, a backplate 13, a diaphragm 14, and an electrode layer 15. It should be noted that some components of the MEMS microphone M (MEMS structure 10) have been omitted in FIG. 1A for sake of brevity.

The substrate 11 is configured to support the dielectric layer 12, the backplate 13, the diaphragm 14, and the electrode layer 15 on one side of the substrate 11. As shown in FIG. 1A, in some embodiments, the substrate 11 has an opening portion 11A. The opening portion 11A allows sound waves received by the MEMS microphone M to pass through and/or enter the MEMS structure 10. For example, the substrate 11 may include silicon or the like, but the present disclosure is not limited thereto.

The dielectric layer 12 is disposed between the substrate 11 and the diaphragm 14, and between the diaphragm 14 and the backplate 13. In other words, the diaphragm 14 is inserted in the dielectric layer 12, so as to provide partial isolation between the substrate 11, the diaphragm 14 and, the backplate 13 from each other. Moreover, the dielectric layer 12 is disposed around the backplate 13 and the diaphragm 14, such that the backplate 13 and the diaphragm 14 are supported at their edges by the dielectric layer 12. The dielectric layer 12 may be made of silicon oxide or the like.

The backplate 13 is a stationary element disposed on one side of the substrate 11. The backplate 13 may have sufficient stiffness such that it would not be bending or movable when the sound waves pass through the backplate 13. For example, the backplate 13 may be a stiff perforated element, but the present disclosure is not limited thereto. As shown in FIG. 1A, in some embodiments, the backplate 13 includes a number of acoustic holes 13A, and each acoustic hole 13A passes through the backplate 13. The acoustic holes 13A are configured to allow the sound waves to pass through.

As shown in FIG. 1A, the backplate 13 may include a conductive layer 131 and an insulating layer 132 covering the conductive layer 131 for protection. The insulating layer 132 may further include a first insulating layer 1321 and a second insulating layer 1322. As shown in FIG. 1A, the conductive layer 131 may be disposed on the dielectric layer 12, the first insulating layer 1321 may be disposed on the conductive layer 131, and the second insulating layer 1322 may be disposed on the first insulating layer 1321. For example, the conductive layer 131 may include poly-silicon or the like, and the insulating layer 132 (e.g., the first insulating layer 1321 or the second insulating layer 1322) may include silicon nitride or the like, but the present disclosure is not limited thereto. Moreover, the first insulating layer 1321 and the second insulating layer 1322 may include the same material or different materials.

The MEMS structure 10 may be electrically connected to a circuit (not shown) via several electrode pads of the electrode layer 15 that is disposed on the backplate 13 and electrically connected to the conductive layer 131 and the diaphragm 14. For example, the electrode layer 15 may include copper, silver, gold, aluminum, the like, alloy thereof, or a combination thereof.

The diaphragm 14 is disposed between the substrate 11 and the backplate 13, and extends across the opening portion 11A of the substrate 11. The diaphragm 14 is movable or displaceable relative to the backplate 13. The diaphragm 14 is configured to sense the sound waves received by the MEMS microphone M. As shown in FIG. 1A, in some embodiments, the diaphragm 14 includes ventilation holes 14A, and an air gap G is formed between the diaphragm 14 and the backplate 13. The sound waves pass through the diaphragm 14 via ventilation holes 14A to reach the air gap G. and then pass through the backplate 13 via acoustic hole 13A.

In more detail, the displacement change of the diaphragm 14 relative to the backplate 13 causes a capacitance change between the diaphragm 14 and the backplate 13. The capacitance change is then converted into an electric signal by circuitry connected with the diaphragm 14 and the backplate 13, and the electrical signal is sent out of the MEMS microphone M through the electrode layer 15.

On the other hand, in order to increase the sensitivity of the diaphragm 14, a number of ventilation holes 14A may be provided in the diaphragm 14 to reduce the stiffness of the diaphragm 14. In some embodiments, there may be more than two ventilation holes 14A. With this structural feature, high sensitivity of the MEMS microphone M can be achieved. In addition, the ventilation holes 14A in the diaphragm 14 are also configured to relieve the high air pressure on the diaphragm 14.

In some embodiments, the MEMS structure 10 further includes a protrusion 133 extending into the air gap G. Referring to FIG. 1A, in some embodiments, the protrusion 133 extends from the backplate 13 towards the diaphragm 14. For example, the protrusion 133 may include a conductive material, such as polycrystalline silicon. Alternately, the protrusion 133 may include a dielectric material, such as silicon nitride, but the present disclosure is not limited thereto.

As shown in FIG. 1A, in some embodiments, the distance d between the protrusion 133 and the diaphragm 14 is smaller than about 0.5 μm. Moreover, in some embodiments, the dielectric layer 12 has an inner edge 121, and the orthogonal projection of one acoustic hole 13A (e.g., the acoustic hole 13A1) on the diaphragm 14 is between the orthogonal projection of the inner edge 121 on the diaphragm 14 and the orthogonal projection of the protrusion 133 on the diaphragm 14.

The protrusion 133 may shrink the critical dimension of the acoustic path P, which may increase the acoustic resistance, thereby enhancing the signal-to-noise ratio (SNR). Furthermore, the distance d may reduce the variation size of fabrication, thereby decreasing the phase mismatch between MEMS microphones.

Figure 1C:
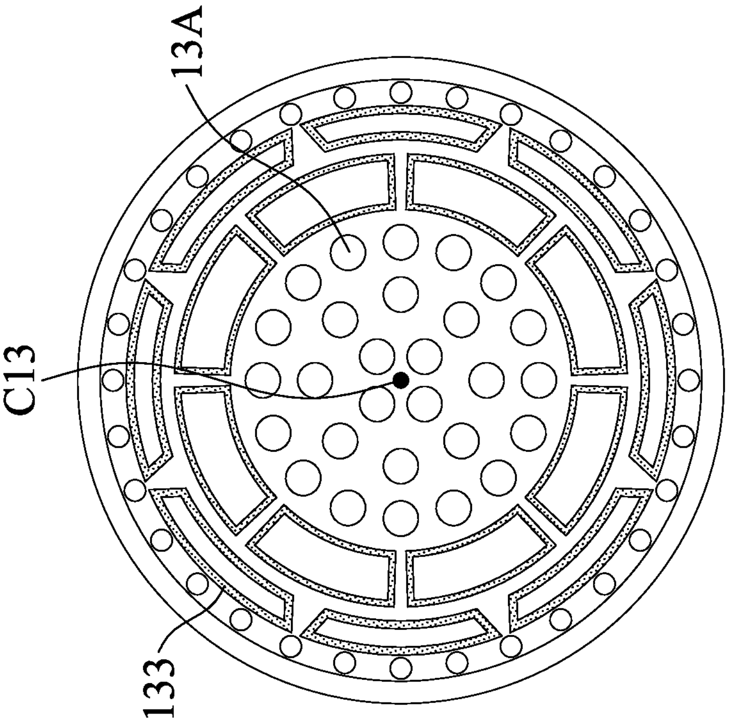
FIG. 1C is a partial top view illustrating the relationship between the protrusion and the acoustic holes of the backplate.
Figure 1B:
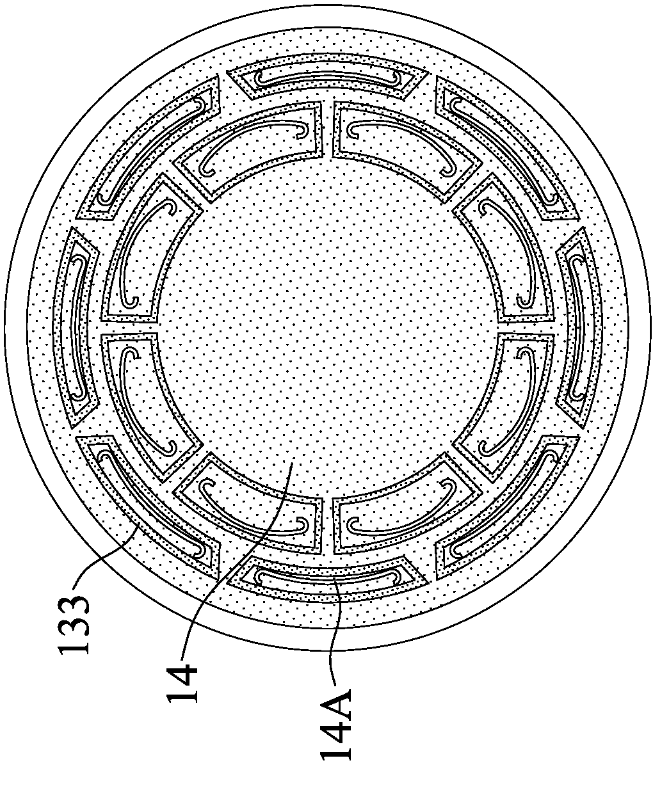
FIG. 1B is a partial top view illustrating the relationship between the protrusion and the ventilation holes of the diaphragm.

FIG. 1B is a partial top view illustrating the relationship between the protrusion 133 and the ventilation holes 14A of the diaphragm 14. FIG. 1C is a partial top view illustrating the relationship between the protrusion 133 and the acoustic holes 13A of the backplate 13. It should be noted that FIG. 1B and FIG. 1C may not correspond exactly to FIG. 1A, and some components have been omitted in FIG. 1B and FIG. 1C for sake of brevity.

Referring to FIG. 1B, in some embodiments, from a top view of the micro-electro-mechanical system structure 10, the protrusion 133 is formed as a closed pattern. In this embodiments, there are more than two protrusion 133 formed as closed patterns that are like quadrilaterals. Moreover, in the embodiment shown in FIG. 1B, the closed patterns formed by the protrusions 133 are separated from each other.

In some embodiments, the closed pattern formed by the protrusion 133 surrounds at least a portion of the ventilation hole 14A. For example, as shown in FIG. 1B, from a top view of the micro-electro-mechanical system structure 10, each quadrilateral-liked protrusion 133 may surround a complete C-shaped ventilation hole 14A, but the present disclosure is not limited thereto.

Referring to FIG. 1C, in some embodiments, the acoustic holes 13A of the backplate 13 are disposed outside the closed pattern formed by the protrusion 133. In more detail, in the embodiment shown in FIG. 1C, some acoustic holes 13A are disposed on the side of the protrusion 133 close to the center C13 of the backplate 13, and at least one acoustic hole 13A is disposed on the side of the protrusion 133 far away from the center C13 of the backplate 13.

Figure 2A:
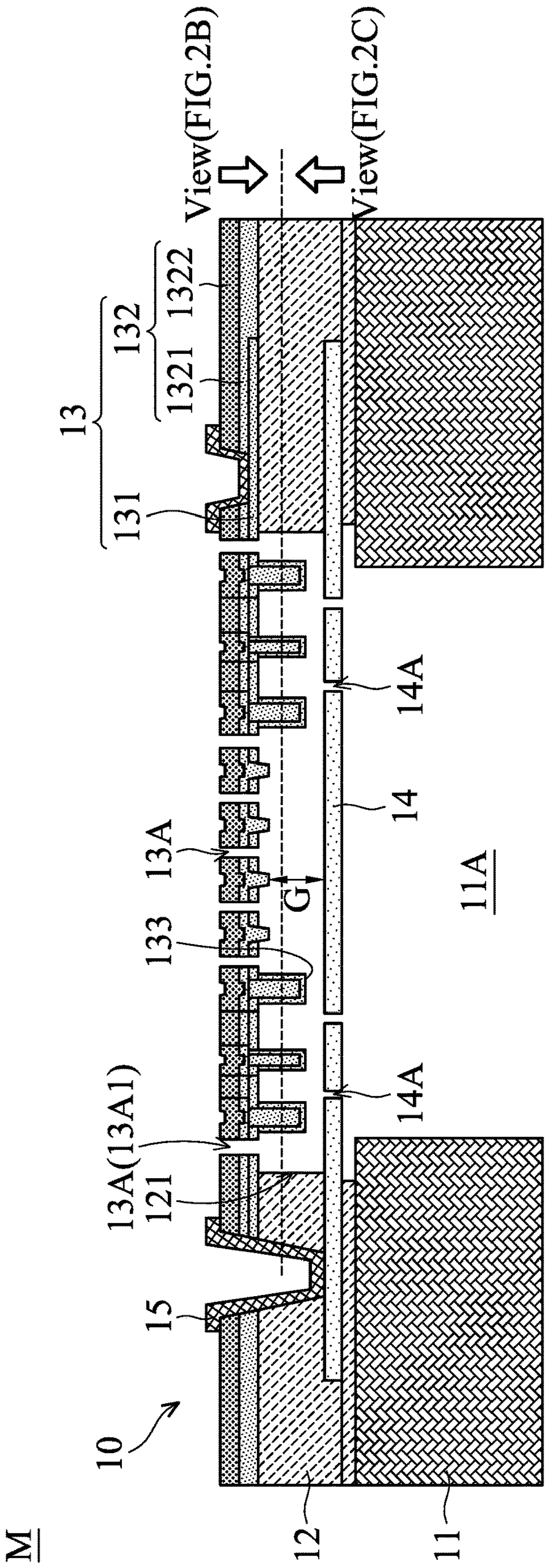
FIG. 2A is a partial cross-sectional view illustrating a micro-electro-mechanical system (MEMS) microphone according to some embodiments of the present disclosure.

FIG. 2A is a partial cross-sectional view illustrating a micro-electro-mechanical system (MEMS) microphone M according to some embodiments of the present disclosure.

Figure 2C:
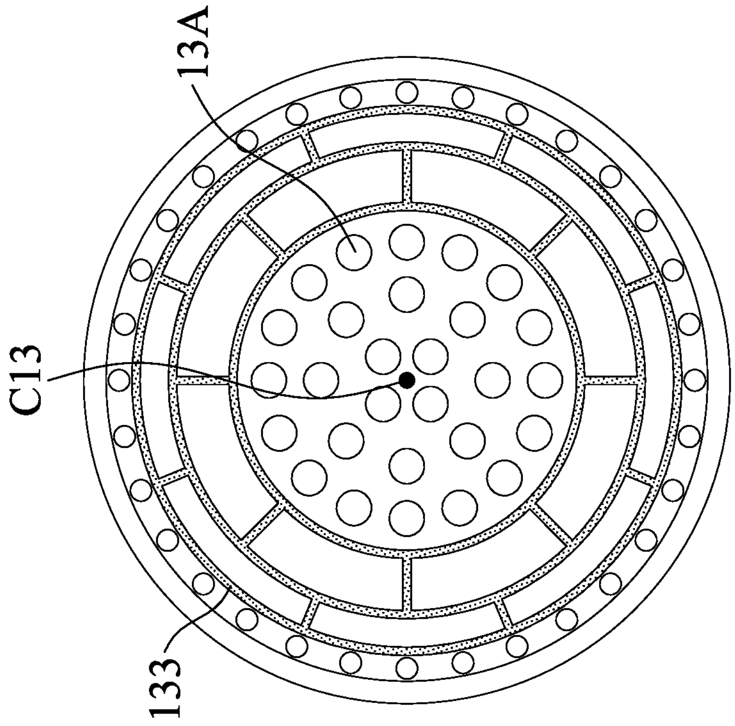
FIG. 2C is a partial top view illustrating the relationship between the protrusion and the acoustic holes of the backplate.
Figure 2B:
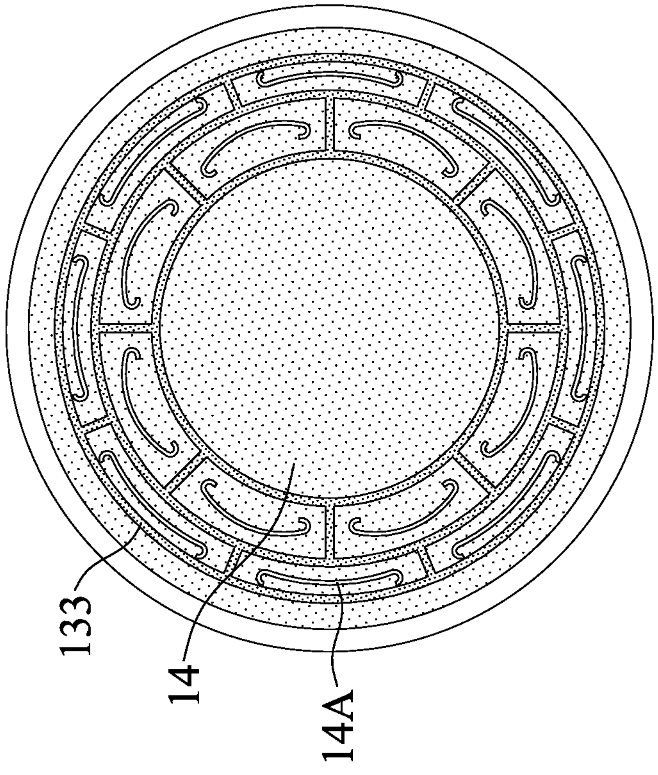
FIG. 2B is a partial top view illustrating the relationship between the protrusion and the ventilation holes of the diaphragm.

FIG. 2B is a partial top view illustrating the relationship between the protrusion 133 and the ventilation holes 14A of the diaphragm 14. FIG. 2C is a partial top view illustrating the relationship between the protrusion 133 and the acoustic holes 13A of the backplate 13. It should be noted that FIG. 2B and FIG. 2C may not correspond exactly to FIG. 2A, and some components have been omitted in FIG. 2A, FIG. 2B, and FIG. 2C for sake of brevity.

Referring to FIG. 2B, in some embodiments, from a top view of the micro-electro-mechanical system structure 10, the protrusion 133 is formed as a closed pattern. In this embodiment, there are more than two protrusion 133 formed as closed patterns that are like quadrilaterals. Moreover, in the embodiment shown in FIG. 2B, the closed patterns formed by the protrusions 133 are connected with each other.

As shown in FIG. 2B, from a top view of the micro-electro-mechanical system structure 10, each quadrilateral-liked protrusion 133 surrounds a complete C-shaped ventilation hole 14A, but the present disclosure is not limited thereto.

Referring to FIG. 2C, in some embodiments, the acoustic holes 13A of the backplate 13 are disposed outside the closed pattern formed by the protrusion 133. In more detail, in the embodiment shown in FIG. 2C, some acoustic holes 13A are disposed on the side of the protrusion 133 close to the center C13 of the backplate 13, and at least one acoustic hole 13A is disposed on the side of the protrusion 133 far away from the center C13 of the backplate 13.

Figure 3A:
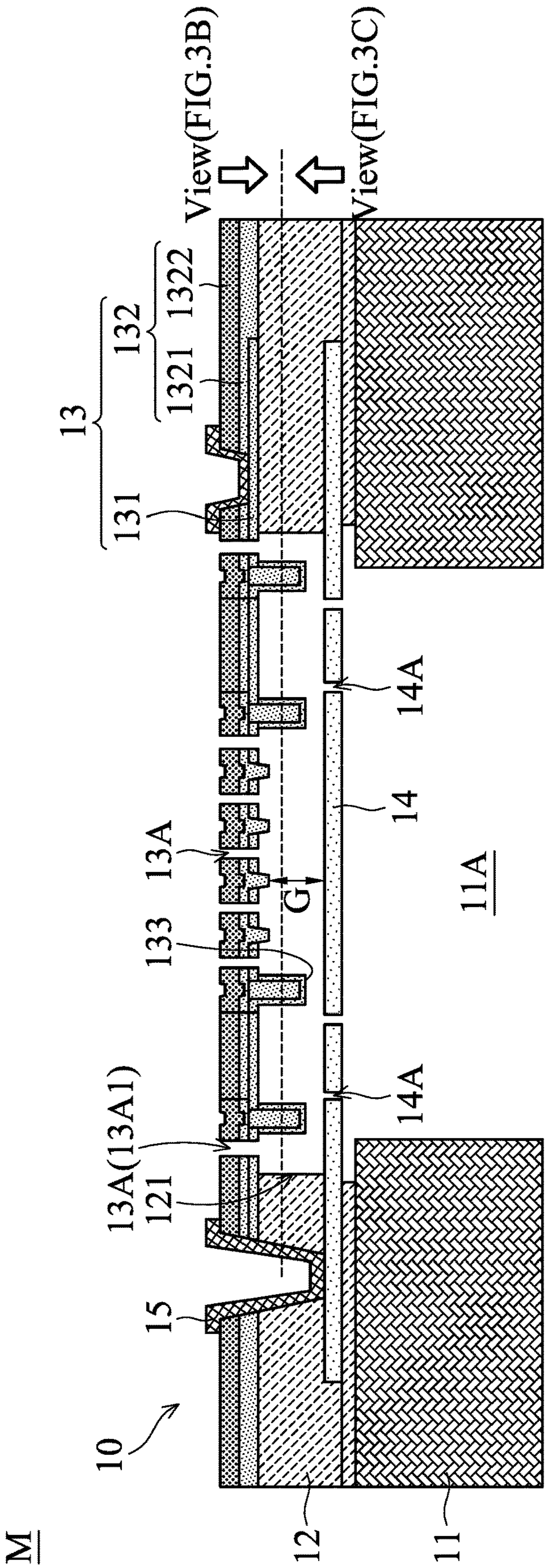
FIG. 3A is a partial cross-sectional view illustrating a micro-electro-mechanical system (MEMS) microphone according to some embodiments of the present disclosure.
Figure 3C:
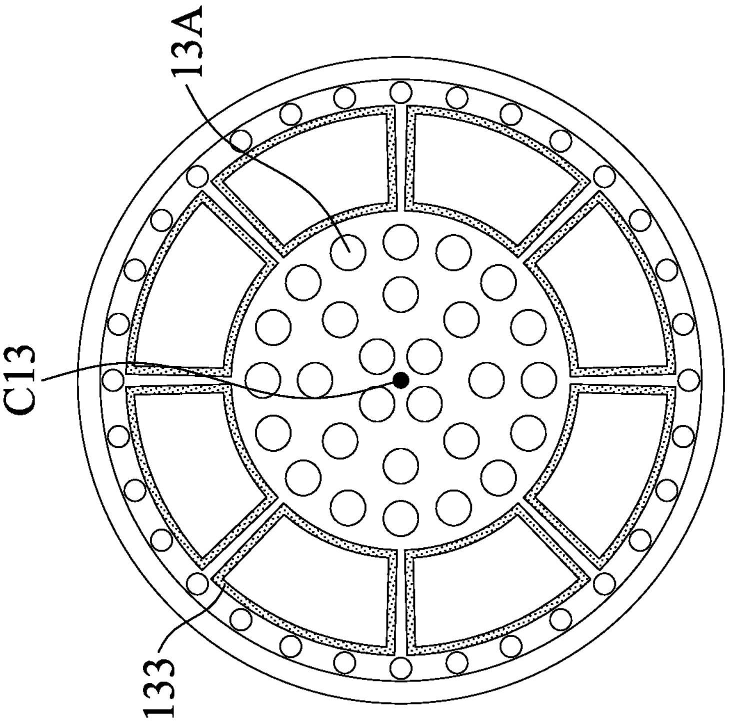
FIG. 3C is a partial top view illustrating the relationship between the protrusion and the acoustic holes of the backplate.
Figure 3B:
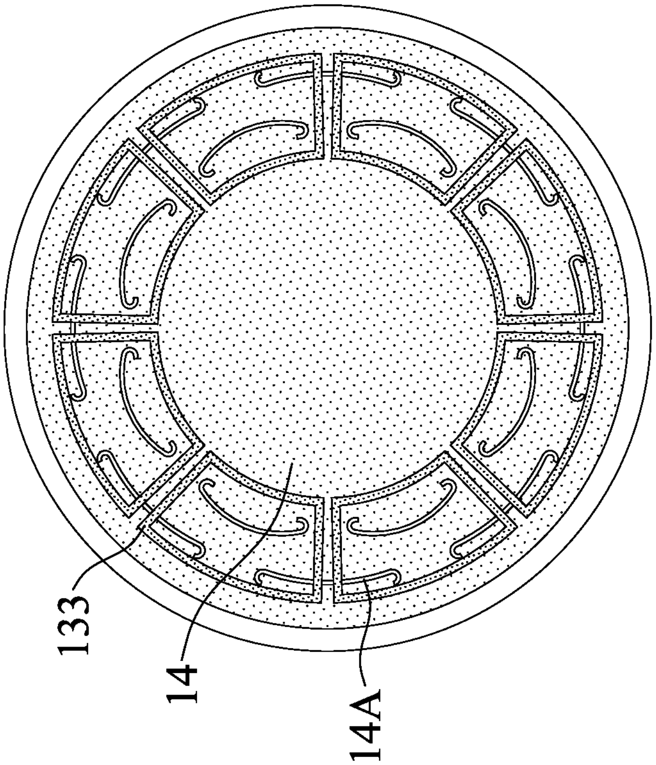
FIG. 3B is a partial top view illustrating the relationship between the protrusion and the ventilation holes of the diaphragm.

FIG. 3A is a partial cross-sectional view illustrating a micro-electro-mechanical system (MEMS) microphone M according to some embodiments of the present disclosure. FIG. 3B is a partial top view illustrating the relationship between the protrusion 133 and the ventilation holes 14A of the diaphragm 14. FIG. 3C is a partial top view illustrating the relationship between the protrusion 133 and the acoustic holes 13A of the backplate 13. It should be noted that FIG. 3B and FIG. 3C may not correspond exactly to FIG. 3A, and some components have been omitted in FIG. 3A, FIG. 3B, and FIG. 3C for sake of brevity.

Referring to FIG. 3B, in some embodiments, from a top view of the micro-electro-mechanical system structure 10, the protrusion 133 is formed as a closed pattern. In this embodiment, there are more than two protrusion 133 formed as closed patterns that are like quadrilaterals. Moreover, in the embodiment shown in FIG. 3B, the closed patterns formed by the protrusions 133 are separated from each other.

As shown in FIG. 3B, from a top view of the micro-electro-mechanical system structure 10, each quadrilateral-liked protrusion 133 surrounds a complete C-shaped ventilation hole 14A and portions of other shaped ventilation holes 14A, but the present disclosure is not limited thereto.

Referring to FIG. 3C, in some embodiments, the acoustic holes 13A of the backplate 13 are disposed outside the closed pattern formed by the protrusion 133. In more detail, in the embodiment shown in FIG. 3C, some acoustic holes are disposed on the side of the protrusion 133 close to the center C13 of the backplate 13, and at least one acoustic hole is disposed on the side of the protrusion 133 far away from the center C13 of the backplate 13.

Figure 4A:
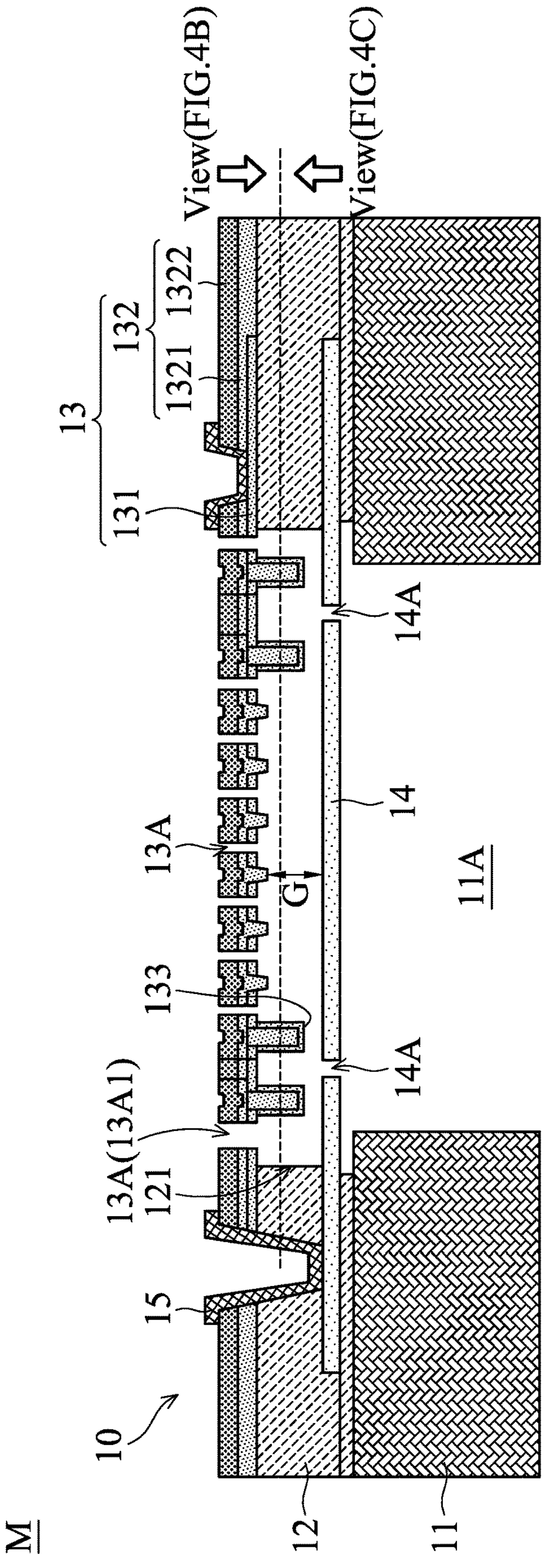
FIG. 4A is a partial cross-sectional view illustrating a micro-electro-mechanical system (MEMS) microphone according to some embodiments of the present disclosure.
Figure 4C:
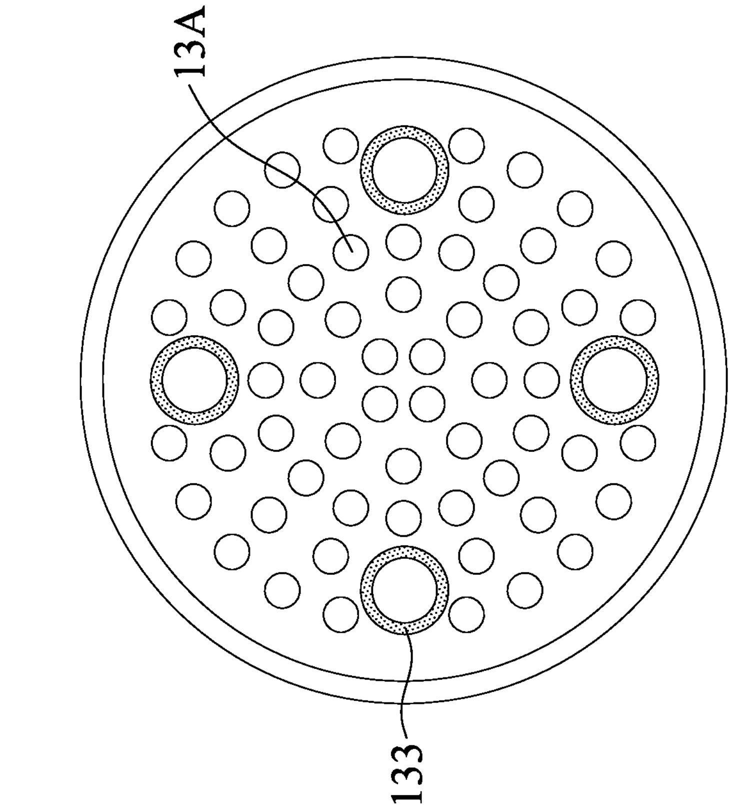
FIG. 4C is a partial top view illustrating the relationship between the protrusion and the acoustic holes of the backplate.
Figure 4B:
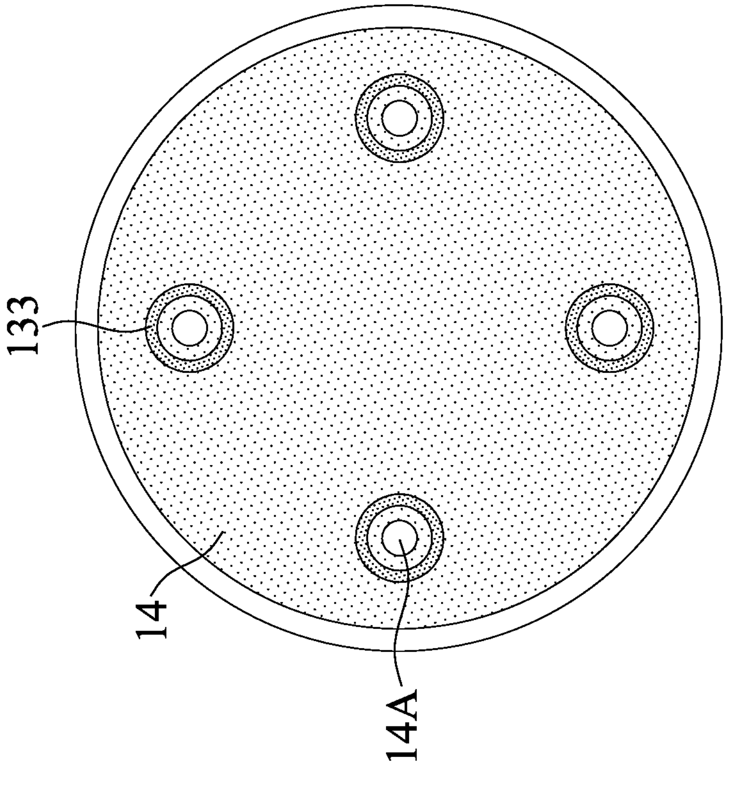
FIG. 4B is a partial top view illustrating the relationship between the protrusion and the ventilation holes of the diaphragm.

FIG. 4A is a partial cross-sectional view illustrating a micro-electro-mechanical system (MEMS) microphone M according to some embodiments of the present disclosure. FIG. 4B is a partial top view illustrating the relationship between the protrusion 133 and the ventilation holes 14A of the diaphragm 14. FIG. 4C is a partial top view illustrating the relationship between the protrusion 133 and the acoustic holes 14A of the backplate 13. It should be noted that FIG. 4B and FIG. 4C may not correspond exactly to FIG. 4A, and some components have been omitted in FIG. 4A, FIG. 4B, and FIG. 4C for sake of brevity.

Referring to FIG. 4B, in some embodiments, from a top view of the micro-electro-mechanical system structure 10, the protrusion 133 is formed as a closed pattern. In this embodiment, there are more than two protrusion 133 formed as closed patterns that are circles. Moreover, in the embodiment shown in FIG. 4B, the closed patterns formed by the protrusions 133 are separated from each other.

As shown in FIG. 4B, from a top view of the micro-electro-mechanical system structure 10, each circular protrusion 133 surrounds a complete circular ventilation hole 14A, but the present disclosure is not limited thereto.

Referring to FIG. 4C, in some embodiments, the acoustic holes 13A of the backplate 13 are disposed outside the closed pattern formed by the protrusion 133.

Figure 5A:
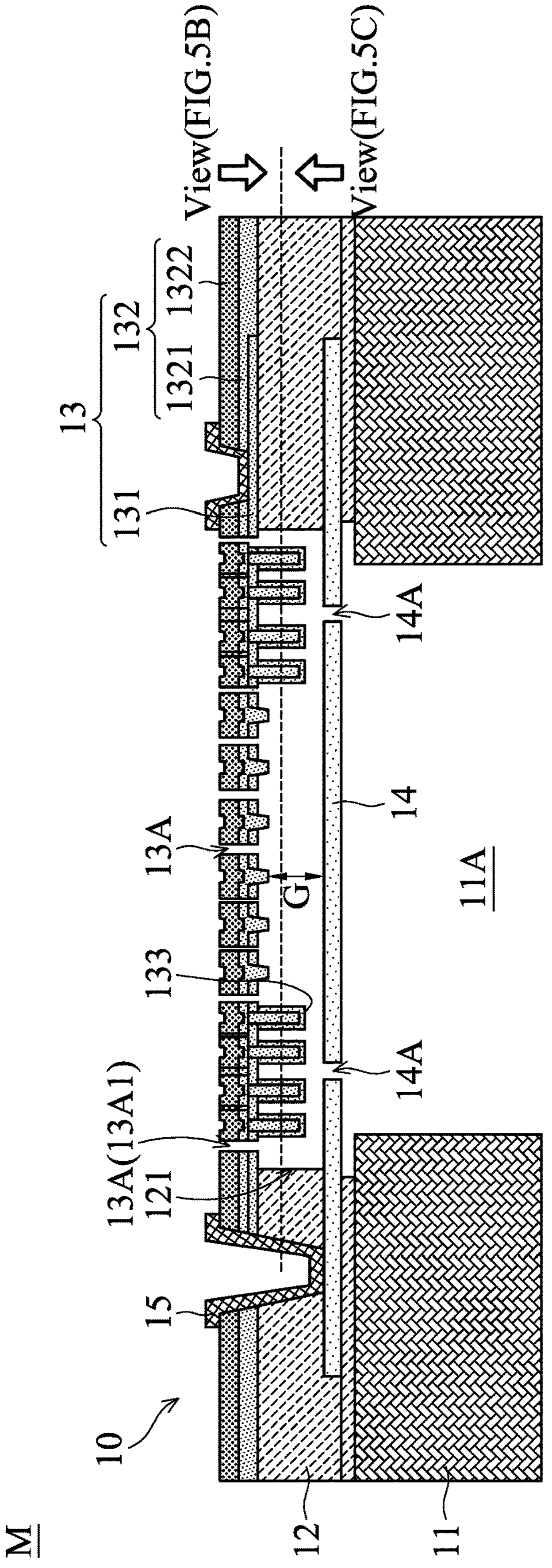
FIG. 5A is a partial cross-sectional view illustrating a micro-electro-mechanical system (MEMS) microphone according to some embodiments of the present disclosure.
Figure 5B:
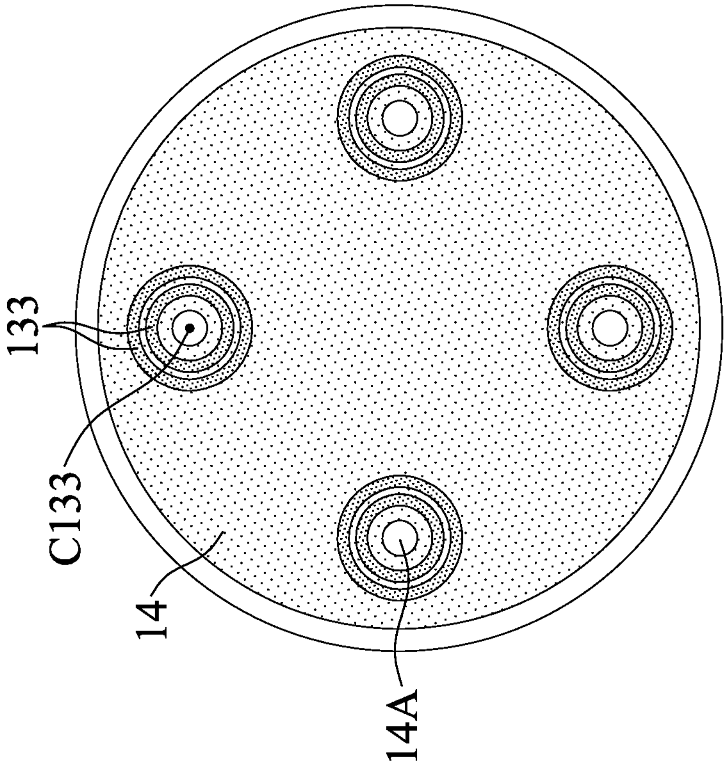
FIG. 5B is a partial top view illustrating the relationship between the protrusion and the ventilation holes of the diaphragm.
Figure 5C:
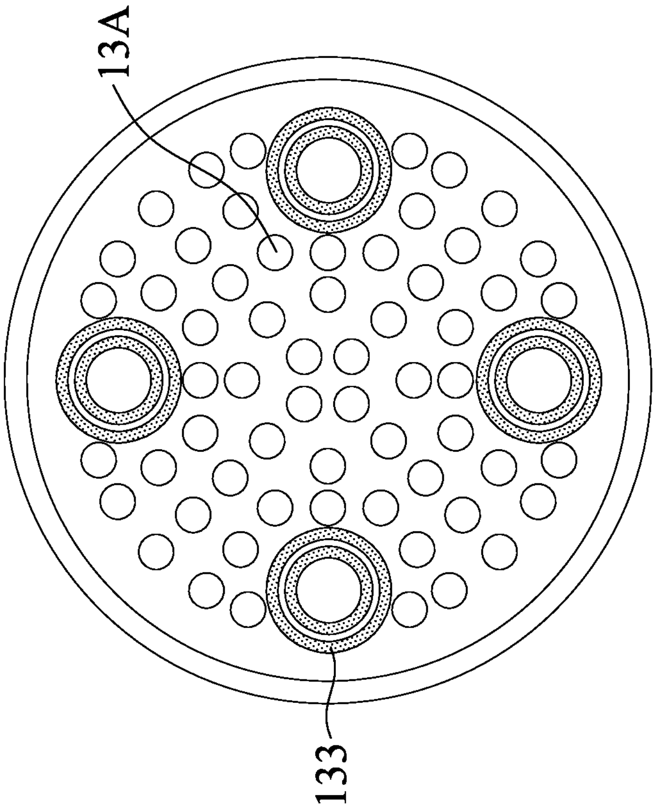
FIG. 5C is a partial top view illustrating the relationship between the protrusion and the acoustic holes of the backplate.

FIG. 5A is a partial cross-sectional view illustrating a micro-electro-mechanical system (MEMS) microphone M according to some embodiments of the present disclosure. FIG. 5B is a partial top view illustrating the relationship between the protrusion 133 and the ventilation holes 14A of the diaphragm 14. FIG. 5C is a partial top view illustrating the relationship between the protrusion 133 and the acoustic holes 13A of the backplate 13. It should be noted that FIG. 5B and FIG. 5C may not correspond exactly to FIG. 5A, and some components have been omitted in FIG. 5A, FIG. 5B, and FIG. 5C for sake of brevity.

Referring to FIG. 5B, in some embodiments, from a top view of the micro-electro-mechanical system structure 10, the protrusion 133 is formed as a closed pattern. In this embodiment, there are more than two protrusion 133 formed as closed patterns that are circles. Moreover, in the embodiment shown in FIG. 5B, the closed patterns formed by the protrusions 133 are separated from each other.

In some embodiments, at least two of the closed patterns formed by the protrusions 133 have the same center. For example, as shown in FIG. 5B, from a top view of the micro-electro-mechanical system structure 10, two closed patterns formed by the protrusions 133 have the same center C133 (i.e., two circular protrusions 133 are arranged in concentric circles), but the present disclosure is not limited thereto. Moreover, in the embodiment shown in FIG. 5B, each ventilation hole 14A is surrounded by two (or more) protrusions 133.

Referring to FIG. 5C, in some embodiments, the acoustic holes 13A of the backplate 13 are disposed outside the closed pattern formed by the protrusion 133.

Figure 6B:
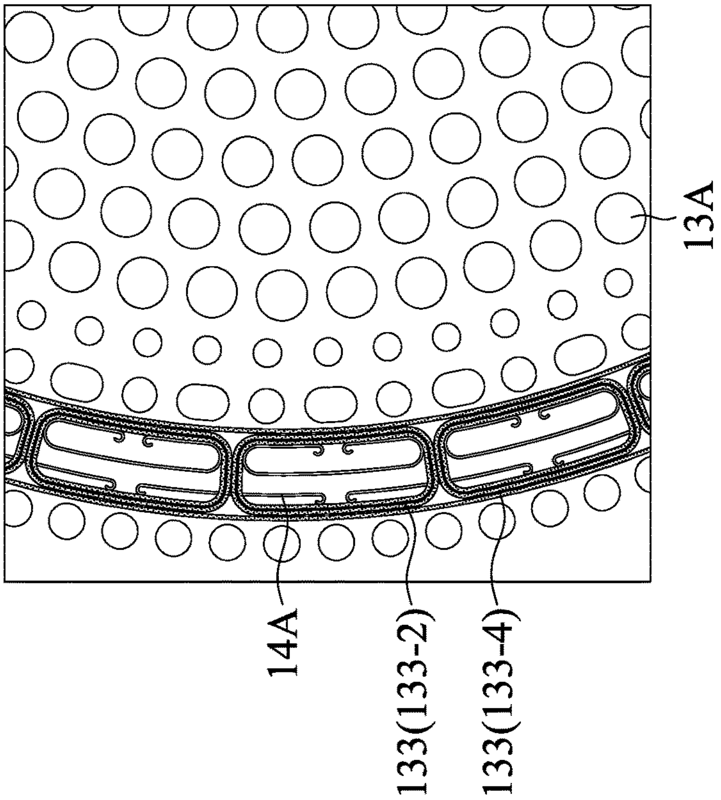
FIG. 6B is a partial top view illustrating the relationship between the protrusion and the ventilation holes of the diaphragm or between the protrusion and the acoustic holes of the backplate according to some other embodiments of the present disclosure.
Figure 6A:
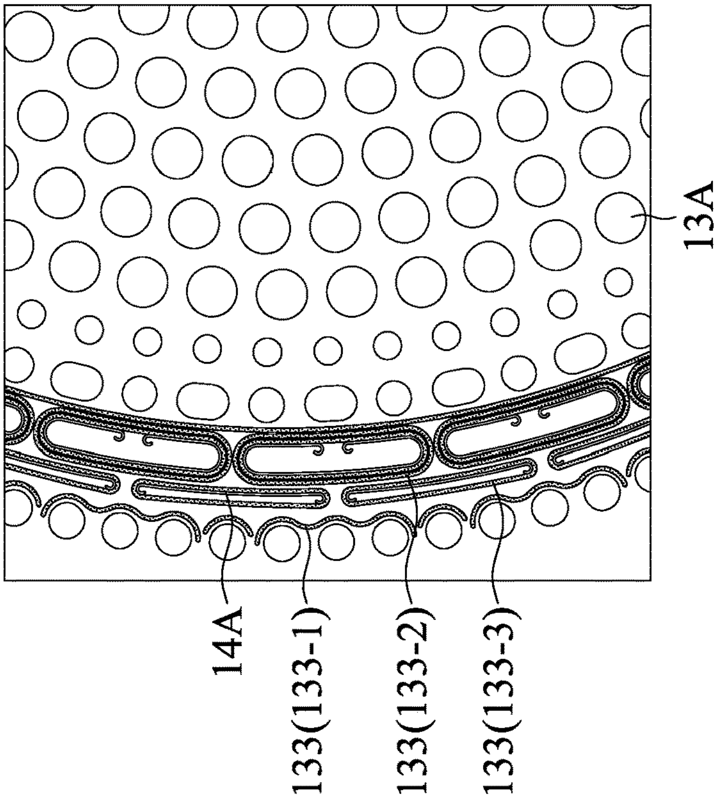
FIG. 6A is a partial top view illustrating the relationship between the protrusion and the ventilation holes of the diaphragm or between the protrusion and the acoustic holes of the backplate according to some embodiments of the present disclosure.

FIG. 6A is a partial top view illustrating the relationship between the protrusion 133 and the ventilation holes 14A of the diaphragm 14 or between the protrusion 133 and the acoustic holes 13A of the backplate 13 according to some embodiments of the present disclosure. FIG. 6B is a partial top view illustrating the relationship between the protrusion 133 and the ventilation holes 14A of the diaphragm 14 or between the protrusion 133 and the acoustic holes 13A of the backplate 13 according to some other embodiments of the present disclosure. Similarly, some components have been omitted in FIG. 6A and FIG. 6B for sake of brevity.

Referring to FIG. 6A and FIG. 6B, in some embodiments, from a top view of the micro-electro-mechanical system structure, the protrusions 133 have different shapes.

As shown in FIG. 6A, the protrusion 133-1 is formed as a curve, and the protrusion 133-2 and the protrusion 133-3 are formed as closed patterns that are like quadrilaterals. The protrusion 133-2 and the protrusion 133-3 have different sizes and each surrounds a complete C-shaped ventilation hole 14A, but the present disclosure is not limited thereto.

As shown in FIG. 6B, the protrusion 133-2 and the protrusion 133-4 are formed as closed patterns that are like quadrilaterals. The protrusion 133-2 and the protrusion 133-3 have different sizes and each surrounds a complete C-shaped ventilation hole 14A and portions of other C-shaped ventilation holes 14A, but the present disclosure is not limited thereto.

FIG. 7, FIG. 8, FIG. 9, and FIG. 10 are partial cross-sectional views illustrating micro-electro-mechanical system (MEMS) microphones M according to some other embodiments of the present disclosure. Similarly, some components have been omitted in FIG. 7, FIG. 8, FIG. 9, and FIG. 10 for sake of brevity. In the embodiments shown in FIG. 7, FIG. 8, FIG. 9, and FIG. 10, the MEMS structure 10 includes a protrusion 141 extending into the air gap G. and the protrusion 141 extends from the diaphragm 14 towards the backplate 13.

Figure 7:
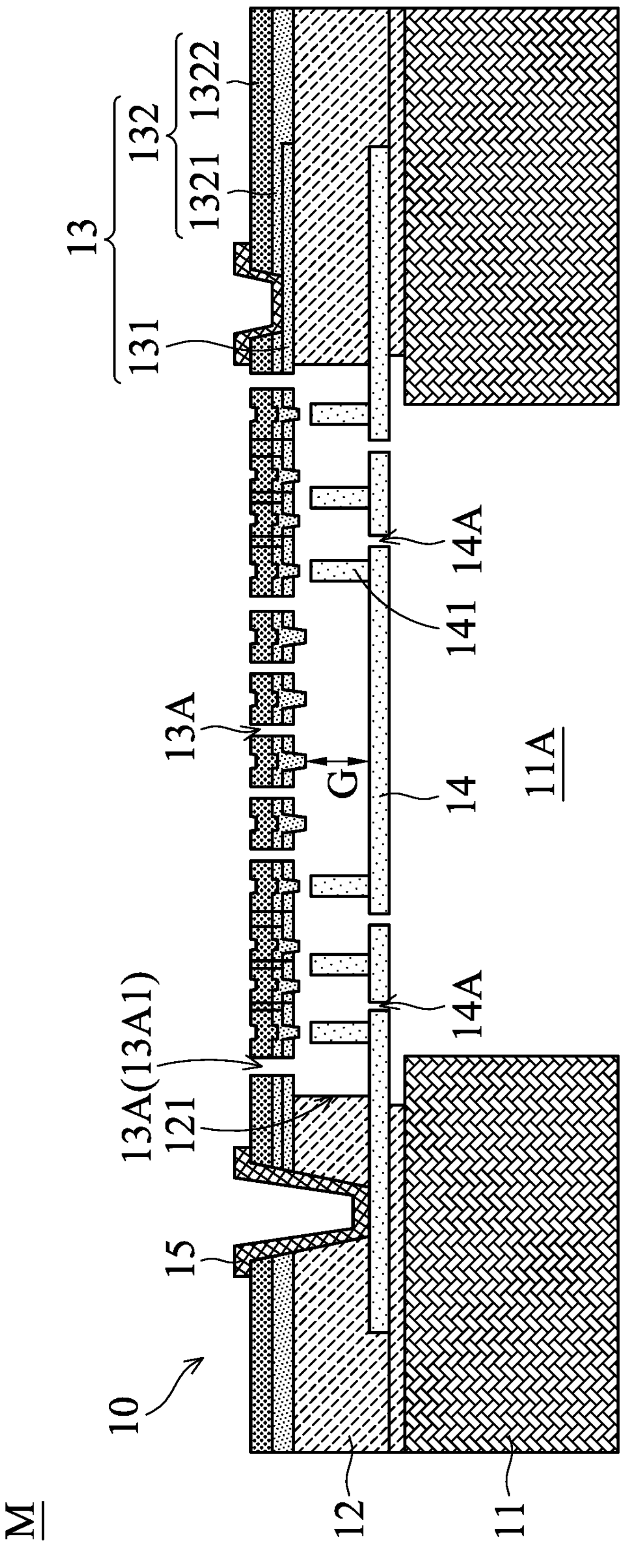
FIG. 7, FIG. 8, FIG. 9, and FIG. 10 are partial cross-sectional views illustrating micro-electro-mechanical system (MEMS) microphones according to some other embodiments of the present disclosure.

The micro-electro-mechanical system structure 10 shown in FIG. 7 has a similar structure to the micro-electro-mechanical system structure 10 shown in FIG. 2A except for the protrusion 141. In other words, the protrusion 141 shown in FIG. 7 may replace the protrusion 133 shown in FIG. 2A. Therefore, the partial top view illustrating the relationship between the protrusion 141 and the ventilation holes 14A of the diaphragm 14 may be similar to FIG. 2B, and the partial top view illustrating the relationship between the protrusion 141 and the acoustic holes 13A of the backplate 13 may be similar to FIG. 2C, but the present disclosure is not limited thereto.

Figure 8:
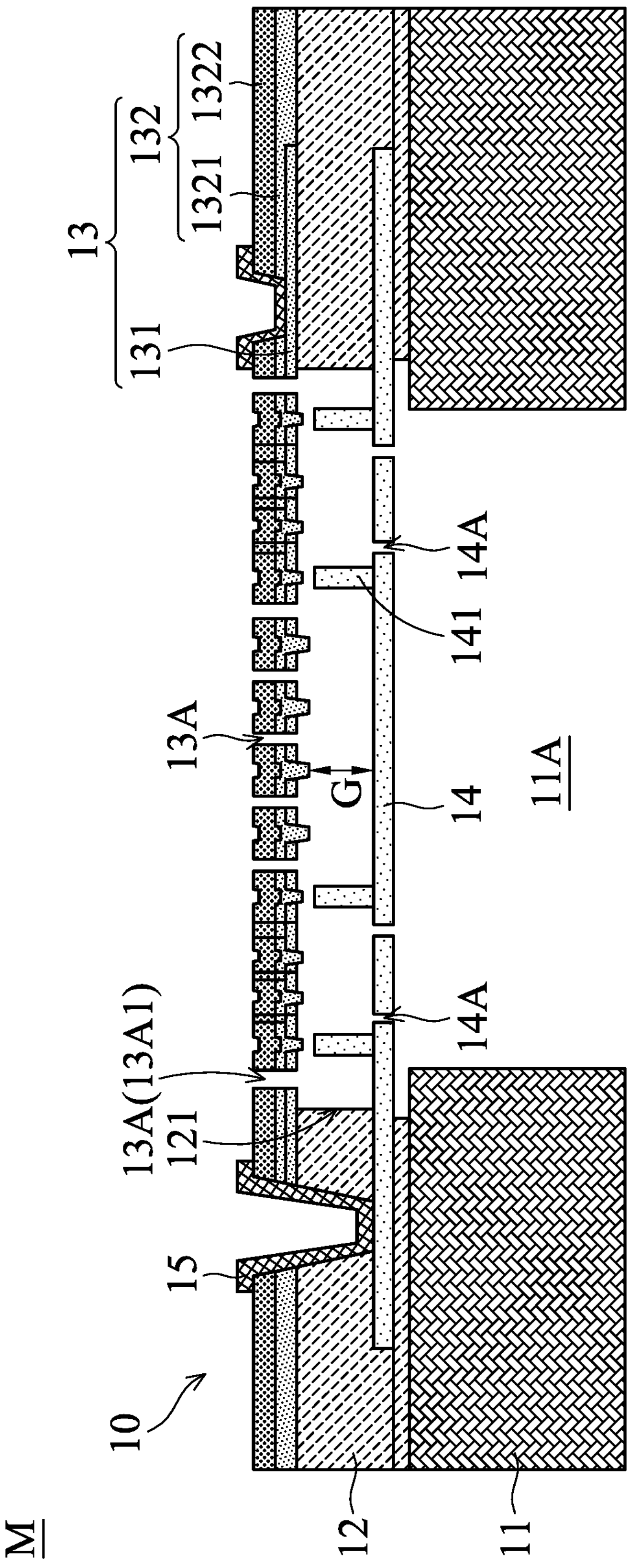

The micro-electro-mechanical system structure 10 shown in FIG. 8 has a similar structure to the micro-electro-mechanical system structure 10 shown in FIG. 3A except for the protrusion 141. In other words, the protrusion 141 shown in FIG. 8 may replace the protrusion 133 shown in FIG. 3A. Therefore, the partial top view illustrating the relationship between the protrusion 141 and the ventilation holes 14A of the diaphragm 14 may be similar to FIG. 3B, and the partial top view illustrating the relationship between the protrusion 141 and the acoustic holes 13A of the backplate 13 may be similar to FIG. 3C, but the present disclosure is not limited thereto.

Figure 9:
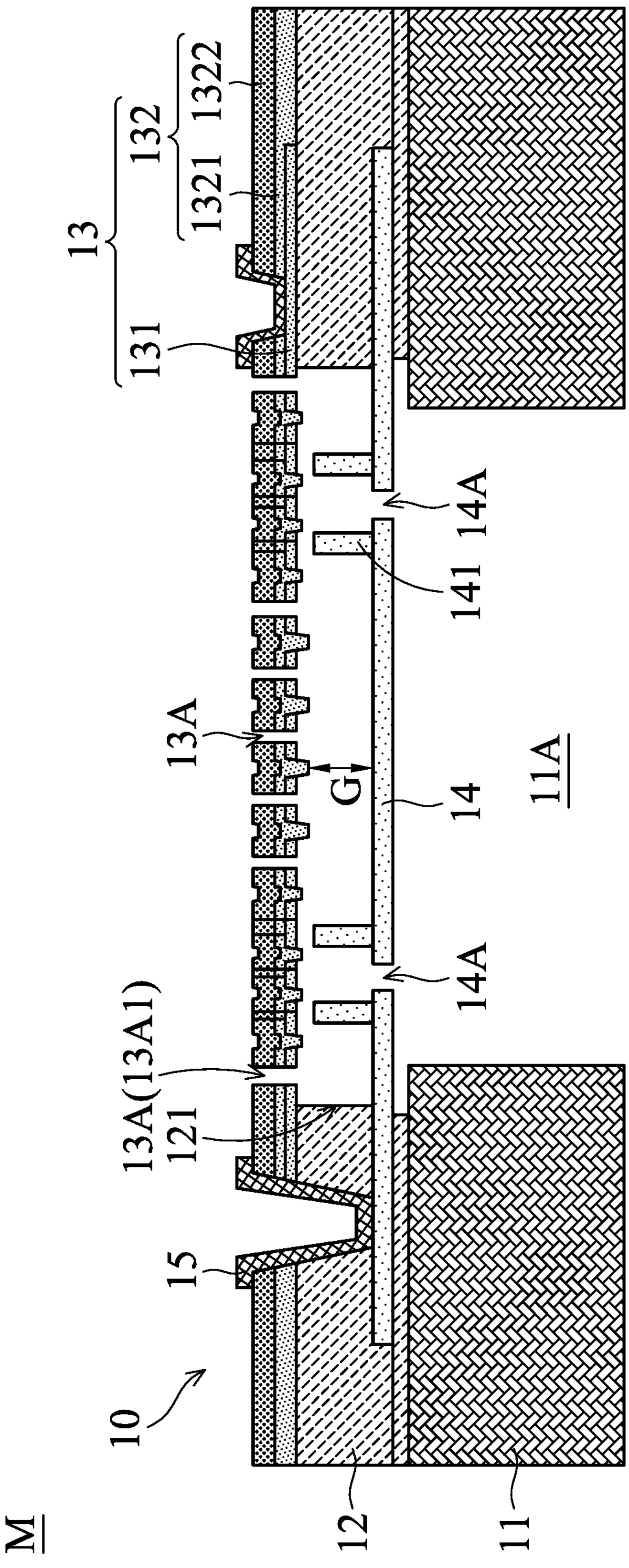

The micro-electro-mechanical system structure 10 shown in FIG. 9 has a similar structure to the micro-electro-mechanical system structure 10 shown in FIG. 4A except for the protrusion 141. In other words, the protrusion 141 shown in FIG. 9 may replace the protrusion 133 shown in FIG. 4A. Therefore, the partial top view illustrating the relationship between the protrusion 141 and the ventilation holes 14A of the diaphragm 14 may be similar to FIG. 4B, and the partial top view illustrating the relationship between the protrusion 141 and the acoustic holes 13A of the backplate 13 may be similar to FIG. 4C, but the present disclosure is not limited thereto.

Figure 10:
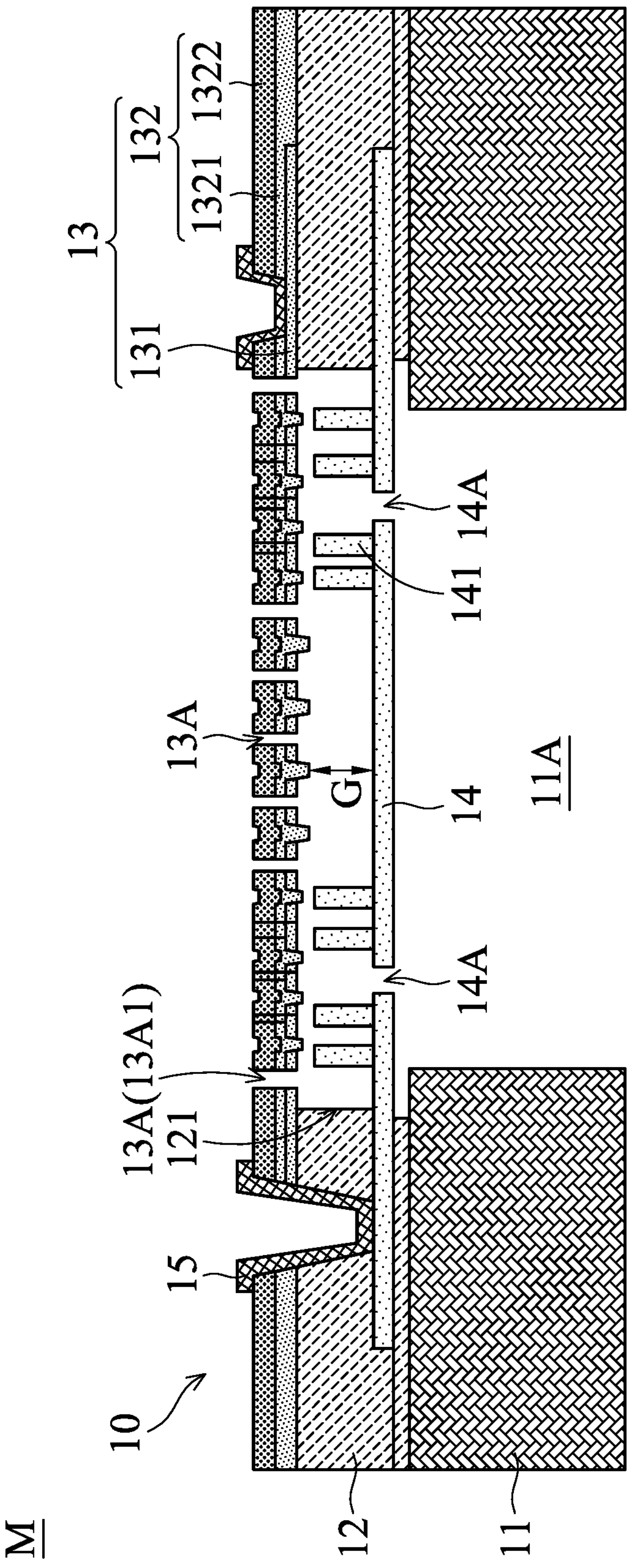

The micro-electro-mechanical system structure 10 shown in FIG. 10 has a similar structure to the micro-electro-mechanical system structure 10 shown in FIG. 5A except for the protrusion 141. In other words, the protrusion 141 shown in FIG. 10 may replace the protrusion 133 shown in FIG. 5A. Therefore, the partial top view illustrating the relationship between the protrusion 141 and the ventilation holes 14A of the diaphragm 14 may be similar to FIG. 5B, and the partial top view illustrating the relationship between the protrusion 141 and the acoustic holes 13A of the backplate 13 may be similar to FIG. 5C, but the present disclosure is not limited thereto.

As noted above, in the embodiments of the present disclosure, since the MEMS structure includes a protrusion extending into the air gap, and the protrusion may shrink the critical dimension of the acoustic path, which may increase the acoustic resistance, thereby enhancing the signal-to-noise ratio (SNR). Furthermore, it may reduce the phase mismatch between MEMS microphones using the MEMS structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description provided herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A micro-electro-mechanical system structure, comprising:

- a substrate having an opening portion;
- a backplate disposed on one side of the substrate and having acoustic holes;
- a diaphragm disposed between the substrate and the backplate, extending across the opening portion of the substrate, and comprising a ventilation hole, wherein an air gap is formed between the diaphragm and the backplate; and
- a protrusion extending into the air gap, wherein from a top view of the micro-electro-mechanical system structure, the protrusion is formed as a closed pattern, and the closed pattern surrounds at least a portion of the ventilation hole.

2. The micro-electro-mechanical system structure as claimed in claim 1, wherein the protrusion extends from the backplate towards the diaphragm.

3. The micro-electro-mechanical system structure as claimed in claim 2, wherein a distance between the protrusion and the diaphragm is smaller than 0.5 μm.

4. The micro-electro-mechanical system structure as claimed in claim 1, wherein the protrusion extends from the diaphragm towards the backplate.

5. The micro-electro-mechanical system structure as claimed in claim 1, wherein the acoustic holes are disposed outside the closed pattern.

6. The micro-electro-mechanical system structure as claimed in claim 1, further comprising:

a plurality of protrusions extending into the air gap.

7. The micro-electro-mechanical system structure as claimed in claim 6, wherein from a top view of the micro-electro-mechanical system structure, the protrusions form a plurality of closed patterns.

8. The micro-electro-mechanical system structure as claimed in claim 7, wherein the closed patterns are connected with each other.

9. The micro-electro-mechanical system structure as claimed in claim 7, wherein the closed patterns are separated from each other.

10. The micro-electro-mechanical system structure as claimed in claim 7, wherein at least two of the closed patterns have the same center.

11. The micro-electro-mechanical system structure as claimed in claim 7, wherein the ventilation hole is surrounded by two or more of the protrusions.

12. The micro-electro-mechanical system structure as claimed in claim 7, wherein from a top view of the micro-electro-mechanical system structure, the protrusions have different shapes.

13. The micro-electro-mechanical system structure as claimed in claim 1, wherein from a top view of the micro-electro-mechanical system structure, the protrusion is formed as a curve.

14. The micro-electro-mechanical system structure as claimed in claim 1, wherein from a top view of the micro-electro-mechanical system structure, at least one of the acoustic holes is disposed on a side of the protrusion far away from a center of the backplate.

15. The micro-electro-mechanical system structure as claimed in claim 1, further comprising:

a dielectric layer disposed between the substrate and the diaphragm and between the diaphragm and the backplate, wherein the dielectric layer has an inner edge, and an orthogonal projection of one of the acoustic holes on the diaphragm is between an orthogonal projection of the inner edge on the diaphragm and an orthogonal projection of the protrusion on the diaphragm.

* * * * *